(12) United States Patent
Grunberg et al.

(10) Patent No.: US 7,500,789 B2
(45) Date of Patent: Mar. 10, 2009

(54) FIBRE OPTIC CABLE COUPLER

(75) Inventors: Ilan Grunberg, Haifa (IL); Avram Matcovitch, Nesher (IL)

(73) Assignee: BioScan Ltd., Yokneam (IL)

( * ) Notice: Subject to any disclaimer, the term of this patent is extended or adjusted under 35 U.S.C. 154(b) by 0 days.

(21) Appl. No.: 10/558,482

(22) PCT Filed: Sep. 18, 2003

(86) PCT No.: PCT/IL03/00752

§ 371 (c)(1),
(2), (4) Date: Dec. 18, 2006

(87) PCT Pub. No.: WO2004/029667

PCT Pub. Date: Apr. 8, 2004

(65) Prior Publication Data

US 2007/0110370 A1    May 17, 2007

(30) Foreign Application Priority Data

Sep. 26, 2002    (IL) .................................... 151954

(51) Int. Cl.
    *G02B 6/36*    (2006.01)
(52) U.S. Cl. .............. 385/53; 385/54; 385/55; 385/56; 385/59; 385/60; 385/62; 385/64; 385/75; 385/76; 385/77; 385/78; 385/81

(58) Field of Classification Search ............... None
See application file for complete search history.

(56) References Cited

U.S. PATENT DOCUMENTS 5,550,944 A * 8/1996 van Woesik et al. ............ 385/73
5,732,175 A * 3/1998 Fan ............................... 385/87

FOREIGN PATENT DOCUMENTS

EP    0347118    12/1989

* cited by examiner

*Primary Examiner*—Sung H Pak
*Assistant Examiner*—Chad H Smith
(74) *Attorney, Agent, or Firm*—Pearl Cohen Zedek Latzer, LLP

(57) ABSTRACT

A fibre optic coupler assembly for optically aligning a sectioned fibre optic cable, the cable having a first end and a second end and comprising one or more fibre optic cores. The assembly comprises a first holder for holding the first end; a second holder for holding the second end coupled to the first end; a retractor for retracting the second end; an aligning unit comprising a resilient construction having a conduit passing through it, for linear alignment of the ends; whereby the first and second ends are coupled by the respective holders and whereby the second end can be linearly aligned in the conduit of the aligning unit, retracted using the retractor, and rotated to obtain rotational alignment of the fiber cores of the ends.

5 Claims, 15 Drawing Sheets

US 7,500,789 B2

FIBRE OPTIC CABLE COUPLER

CROSS-REFERENCE TO RELATED APPLICATIONS

This application is a National Phase Application of PCT International Application No. PCT/IL2003/000752, International Filing Date Sep. 18, 2003, claiming priority of IL Patent Application, 151954, filed Sep. 26, 2002.

FIELD OF THE INVENTION

The subject of the invention relates to improvements to couplers for fibre optic cables.

BACKGROUND OF THE INVENTION

Prior solutions to the problem of coupling and uncoupling of fibre optic cables have been provided. European patent 0347118 provides a fibre connector for end-to-end abutment with another like fibre connector, where a fibre cable can be positioned in the connector for termination thereof. U.S. Pat. No. 5,550,944 provides a fibre optic coupling assembly that includes a coupling assembly comprised of a spring loaded coupling lock which locks two fibre connectors together by way of spring balls located in locking grooves.

However there are a number of limitations in prior art connectors, which can be ameliorated.

- They are manufactured for a specific cable diameter rather than accepting a range of diameters.
- They do not provide an easy means for rotating multiple-core cables until correct alignment is achieved.
- They require a special connector at each abutting cable section end, making it impossible to slip a device such as an angioplasty balloon over one of the cable sections.
- They require high degrees of tolerance and tend to become unusable after some tens of uses due to wear.
- They are expensive to manufacture due to the costs of materials and the need to maintain high tolerances.

Therefore, it is a main object of the present invention to provide a coupling means for coupling and decoupling a fiber optic cable, the cable comprising one or more fibre optic cores.

Other benefits of the present invention include:

The exact cable diameter is not relevant.
The device operates with low tolerances, keeping it effective after many uses.
Operation is easy, with the user simply pushing down on a button or clip or pulling out and rotating a cylinder.
One or both of the cable sections can be used with the device without being fitted with a connector.
There is no ambiguity about choosing the right insertion opening for each cable end.
The components are manufactured with very loose tolerances, except for the alignment groove and the securing mechanism. In addition most of the parts can be made of inexpensive plastic. Therefore the coupler is suitable for inexpensive mass production and hence can be used for disposable applications.

BRIEF DESCRIPTION OF THE INVENTION

There is thus provided in accordance with a preferred embodiment of the present invention, A fibre optic coupler assembly for optically aligning a sectioned fibre optic cable, the cable having a first end and a second end and comprising one or more fibre optic cores, the assembly comprising:

a first holder for holding the first end;
a second holder for holding the second end coupled to the first end;
a retractor for retracting the second end;
an aligning unit comprising a resilient construction having a conduit passing through it, for linear alignment of the ends;

whereby the first and second ends are coupled by the respective holders and whereby the second end can be linearly aligned in the conduit of the aligning unit, retracted using the retractor, and rotated to obtain rotational alignment of the fiber cores of the ends.

Furthermore, in accordance with another preferred embodiment of the present invention, the first holder comprises a first guide having a bore extending therethrough adjacent to a first cable lock also with a bore extending therethrough adjacent to the distal end of the aligning unit; the bores for receiving the first cable end.

Furthermore, in accordance with another preferred embodiment of the present invention, the lock comprises a spring pad connected by rods to a release button.

Furthermore, in accordance with another preferred embodiment of the present invention, the second holder comprises a second guide having a bore extending therethrough adjacent to a proximal end of the aligning unit, the second guide bore for receiving the second end, the second guide further equipped with a second lock.

Furthermore, in accordance with another preferred embodiment of the present invention, the second lock is a luer connector.

Furthermore, in accordance with another preferred embodiment of the present invention, the retractor comprises a spring adjacent to the second holder, the force of the spring restrained by a clip.

Furthermore, in accordance with another preferred embodiment of the present invention, the aligning unit comprises a first part having along a longitudinal axis a flat surface with a groove running down the middle of the surface, the groove having a diameter less than the diameter of the ends, a second part having a flat face along a longitudinal axis, the two parts held together along their flat faces by a spring mechanism, the face of the second part holding the ends in the groove of the first part, the spring mechanism holding the two parts together while enabling them to move apart when the retractor is operated, thereby allowing rotation of the second end when the second holder is rotated.

There is thus also provided in accordance with a preferred embodiment of the present invention, a fibre optic coupler assembly for optically aligning a sectioned fibre optic cable, the cable having a first end and a second end and comprising one or more fibre optic cores, the assembly comprising a means for holding the first end;
a means for holding the second end coupled to the first end;
a means for retracting the second end;
a means for resiliently linearly aligning the ends;

whereby the first and second ends are coupled by the respective holding means and whereby the second end can be linearly aligned in the aligning means, retracted using the retracting means, and rotated to obtain rotational alignment of the fiber cores of the ends.

There is thus also provided in accordance with a preferred embodiment of the present invention, a method for optically aligning a sectioned fibre optic cable, the cable having a first end and a second end and comprising one or more fibre optic cores, the method comprising holding the first end;

holding the second end coupled to the first end;
retracting the second end;
resiliently linearly aligning the ends;

wherein the first and second ends are coupled and wherein the second end is linearly aligned, retracted, and rotated to obtain rotational alignment of the fiber cores of the ends.

BRIEF DESCRIPTION OF THE FIGURES

The invention is described herein, by way of example only, with reference to the accompanying Figures, in which like components are designated by like reference numerals.

Figure 1:
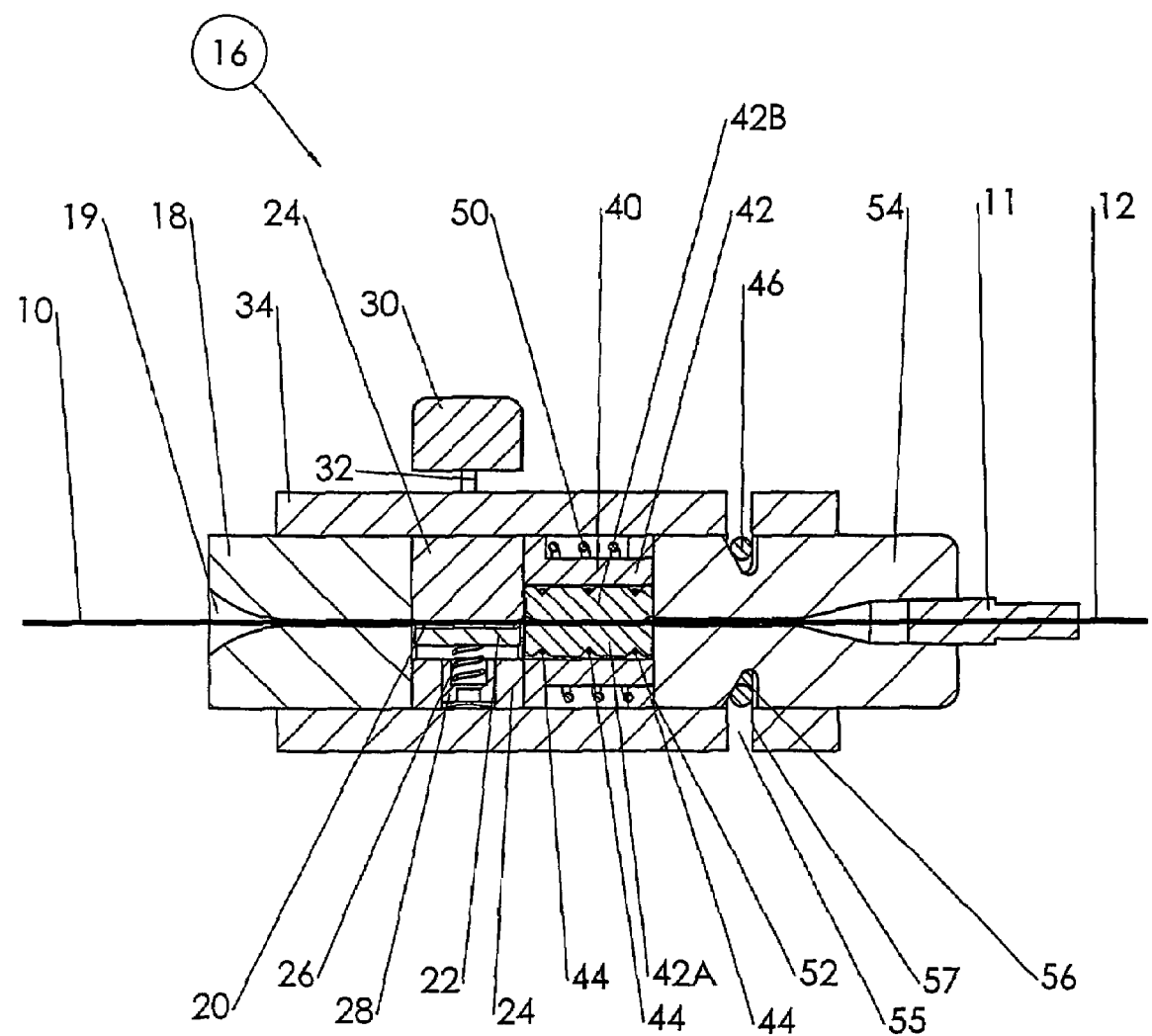
FIG. 1 is a longitudinal centre line section view of two fibre optic cables interconnected to an intermediate cable coupler.

Part numbers used in this specification:
10 first cable
11 cable luer
12 second cable
13 sleeve
14 fibre
15 filler
16 fibre optic cable coupler
18 first cable guide
19 guide hole
20 cable locking pad
22 cable locking seat
24 cable locking cylinder
26 cable locking spring
28 cable locking spring seat
30 cable locking button
32 cable locking rod
34 main barrel
35 barrel cavity
36 hole for cable locking rod
38 channel for retention clip
40 alignment cylinder holder
41 alignment cylinder holder cavity
42 alignment cylinder
42A grooved alignment cylinder component
42B flat alignment cylinder
44 alignment spring component
46 retraction clip
48 retraction clip button
50 pressure spring
52 washer
54 second cable guide
55 channel
56 clip releasing wall
57 clip stop wall

DETAILED DESCRIPTION OF THE INVENTION

The present invention is a coupler for end-to-end connection of segments of cables comprising one or more fibre optic cores.

A typical of use of the present invention is for over-the-wire angioplasty balloon treatment, where a fiber optic cable that is collecting data in a blocked heart vessel is also used as a guide-wire for a balloon. In this application the cable must be cut at some point to allow the balloon to be attached and then reconnected.

Figure 2:
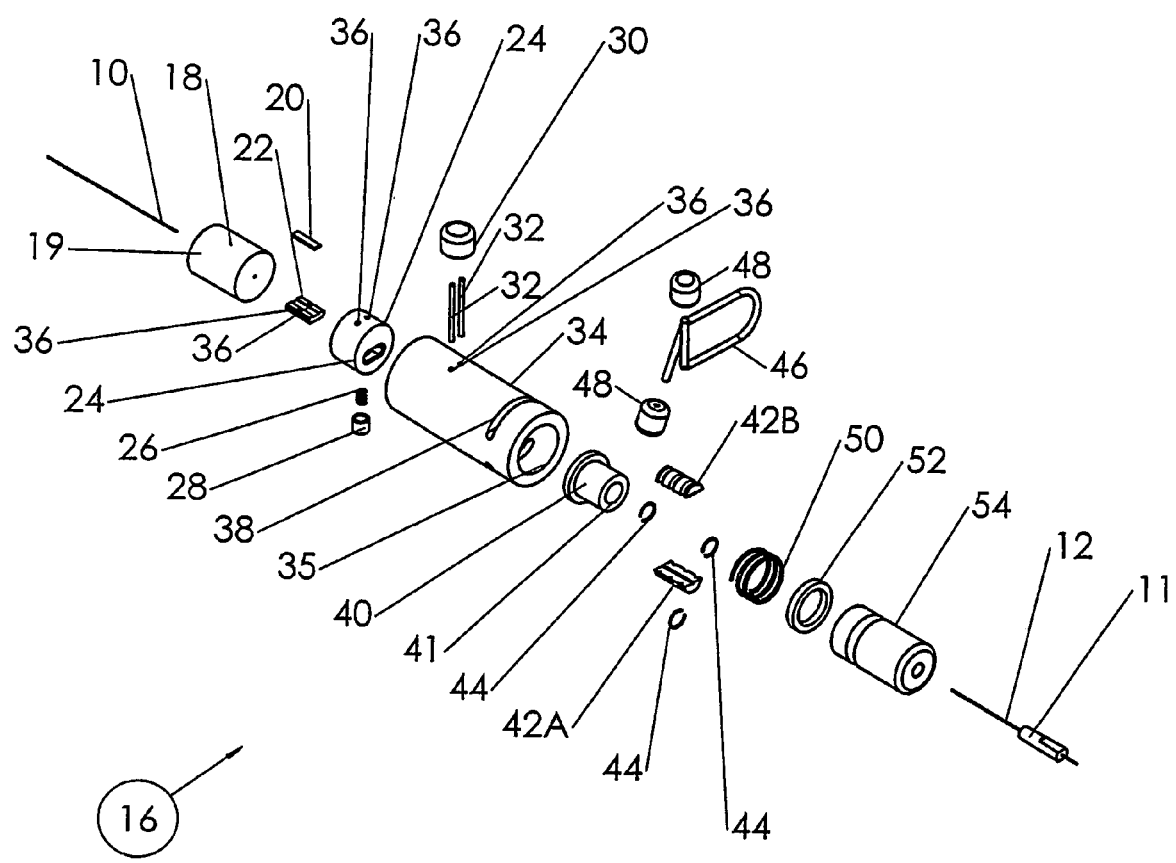
FIG. 2 is an exploded view of the coupler shown in FIG. 1.

With reference first to FIGS. 1 and 2, the fibre optic cable coupler assembly 16 can receive at opposite ends identical fibre optic cables. For purposes of description, the cables and the ends into which they fit are labeled in this specification "first" and "second." These designations are for ease of description and do not have functional implications, i.e., first cable 10 could equally have been called second cable, and vice versa.

The coupler 16 comprises three primary mechanisms: a means for holding a first cable, a means for holding a second cable, and a means for rotating the second cable until the fibers align. The primary innovation of the coupler lies in the means for rotating the second cable, the heart of which is the alignment cylinder 42, as will be explained later.

First cable guide 18 is a cylinder provided with a hole 19 for receiving first fiber optic cable 10. Hole 19 widens at the proximal end to facilitate insertion of cable 10. First cable guide 18 sits inside barrel cavity 35, which is a cylindrical element, against cable locking cylinder 24.

A means is required to lock first cable 10 in place once the cable has been inserted as far as alignment cylinder 42. In the preferred embodiment this is implemented as a spring-actuated mechanism described below. This is a convenient locking mechanism but many other cable locking mechanisms are known to those skilled in the art.

Cable locking seat 22 is an elongated element that holds cable locking pad 20. Cable locking seat 22 is pressed up by cable locking spring 26. Cable locking pad 20 is an elongated element made from a malleable material such as rubber, that holds first cable 10 against locking cylinder 24.

Cable locking spring 26 sits in cable locking spring seat 28. Seat 28 is a cylindrical element that is threaded into locking cylinder 24, such that spring 26 normally presses up against cable locking seat 22.

When pressure is applied to locking button 30, the button pushes down on rods 32 which in turn move down through holes 36 pushing down seat 22. Downward movement of seat 22 releases pad 20 freeing cable 10 to move laterally between pad 20 and locking cylinder 24. When pressure is released from locking button 30, the mechanism works in reverse, with the result that first cable 10 is held in place between pad 20 and locking cylinder 24.

Cylinder 24 sits inside cavity 35 of main barrel 34 against alignment cylinder holder 40. Alignment cylinder 42 is a cylinder-shaped component comprising grooved alignment cylinder component 42A and flat alignment cylinder component 42B, held together with alignment springs 44. When a cable 10 or 12 is inserted into the longitudinal groove running along the face of grooved alignment cylinder component 42A, the part of the cable that extends above the surface of grooved component 42A forces flat alignment cylinder component 42B out against alignment springs 44. When the insertion force stops, springs 44 keep flat component 42B against the cable holding the cable loosely in place against grooved component 42A.

It will be noted that alignment cylinder 42 is the primary component of the apparatus, providing a means for holding cables in place to make the connection between the cables but not holding the cables so tightly that the cables cannot be rotated to seek proper alignment. Since the channel holding the cables is formed from a flexible meeting of a groove with a flat surface, rather than being a fixed diameter bore, the cable does not have to be a precise diameter, rather the cable can be any diameter that extends beyond the groove up to a diameter that forces flat component 42B to a point where it impacts on cavity 41 of alignment cylinder holder 40.

Alignment cylinder 42 sits inside cavity 41 of alignment cylinder holder 40. Alignment cylinder holder 40 sits inside pressure spring 50 and washer 52 and against second cable guide 54.

Second cable guide 54 is a cylindrical element with channel 55 in its exterior surface running along the circumference to a depth adequate to hold retraction clip 46. Clip stop wall 57 of channel 55 is perpendicular to the exterior of second guide 54 while clip releasing wall 56 is angled in about 45 degrees such that when clip buttons 48 are squeezed together, clip 46 pushes out along clip releasing wall 56 till it comes out of channel 55 releasing second cable guide 54, which is then forced out by pressure of spring 50 against washer 52.

Figure 3:
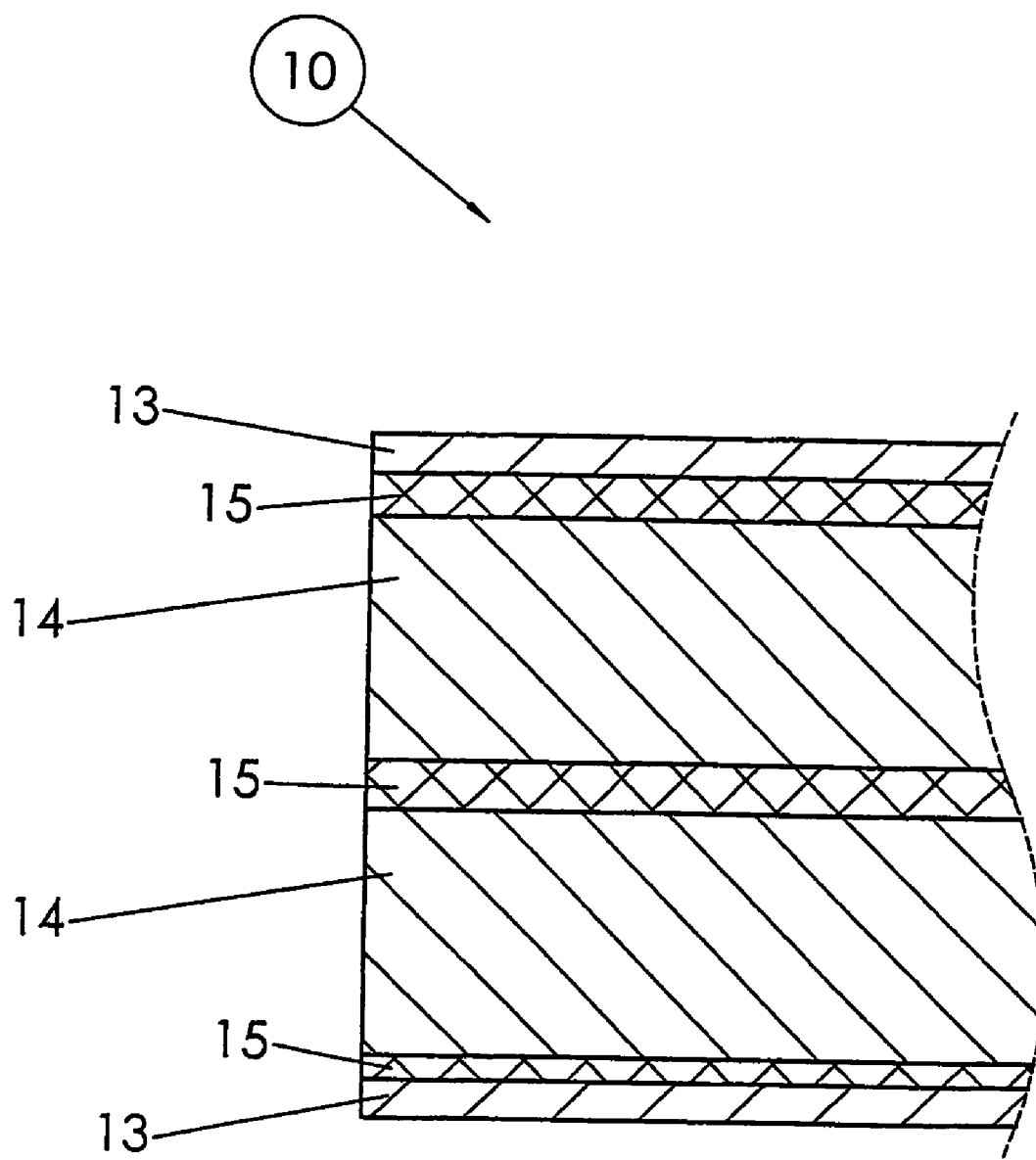
FIG. 3 is a longitudinal centre line section view of a first cable used with the coupler.

With reference now to FIG. 3, first cable 10 is a typical fibre optic cable, comprising sleeve 13 and one or more optical fibers 14.

Figure 4:
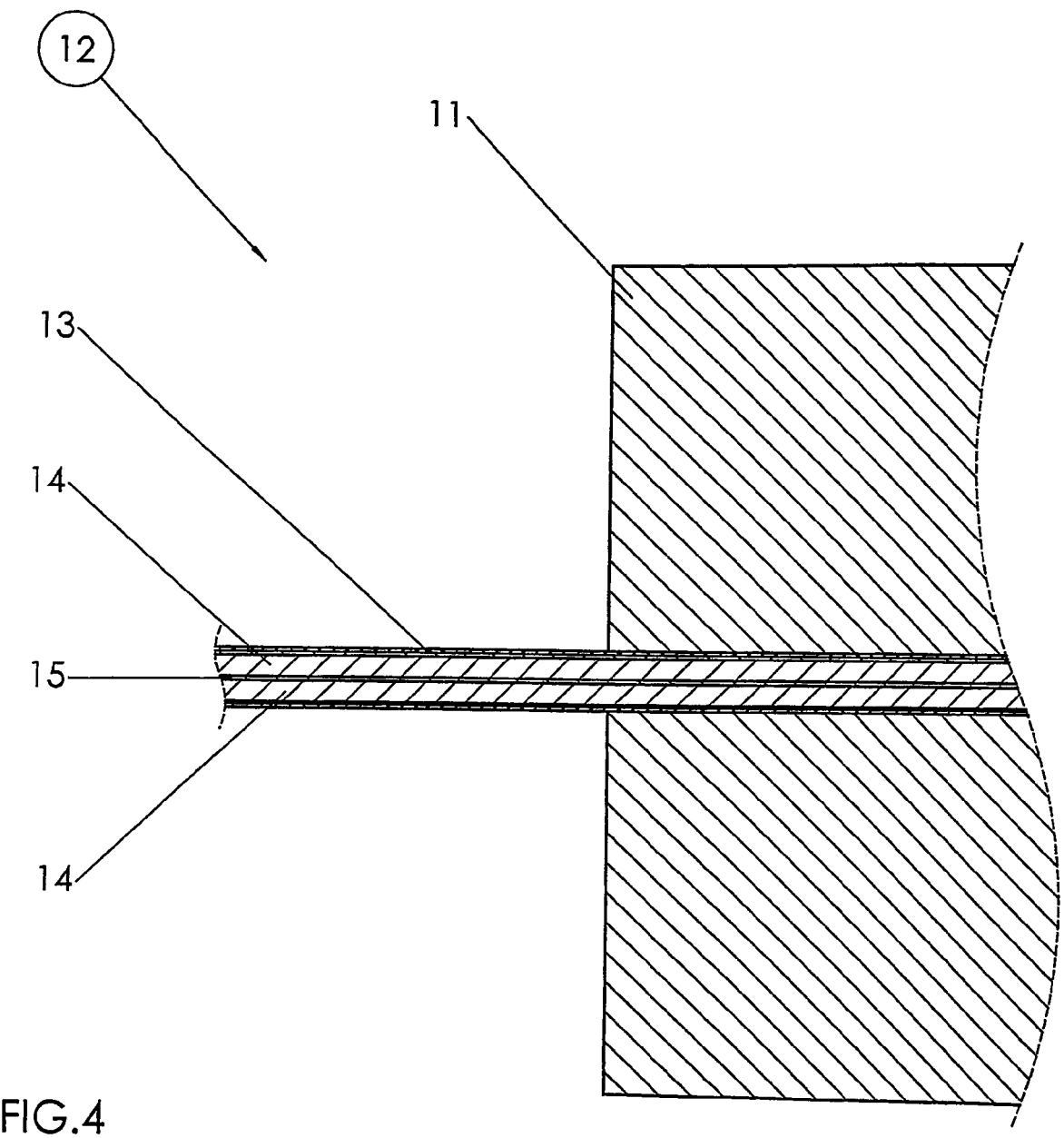
FIG. 4 is a longitudinal centre line section view of a second cable used with the coupler.

With reference now to FIG. 4, second cable 12 is the same type of cable as first cable 10. Second cable 12 is further fitted with a male luer connector 11 to lock cable 12 into second cable guide 54.

First cable 10 and second cable 12 are two disconnected segments of a single original cable. The coupler 16 is used to reconnect the segments.

A means is required to lock second cable 12 into second cable guide 54 once cable 12 has been inserted through the guide to alignment cylinder 42. In the preferred embodiment this is implemented as a male luer connector 11 at the end of cable 12 which fits into a female luer connector shape at the start of bore 56 in second cable guide 54.

This is a convenient mechanism, particularly familiar in the medical environment but many other cable locking mechanisms are known to those skilled in the art.

With reference now to FIGS. 5-15 the operation of the coupler will be described.

Figure 5:
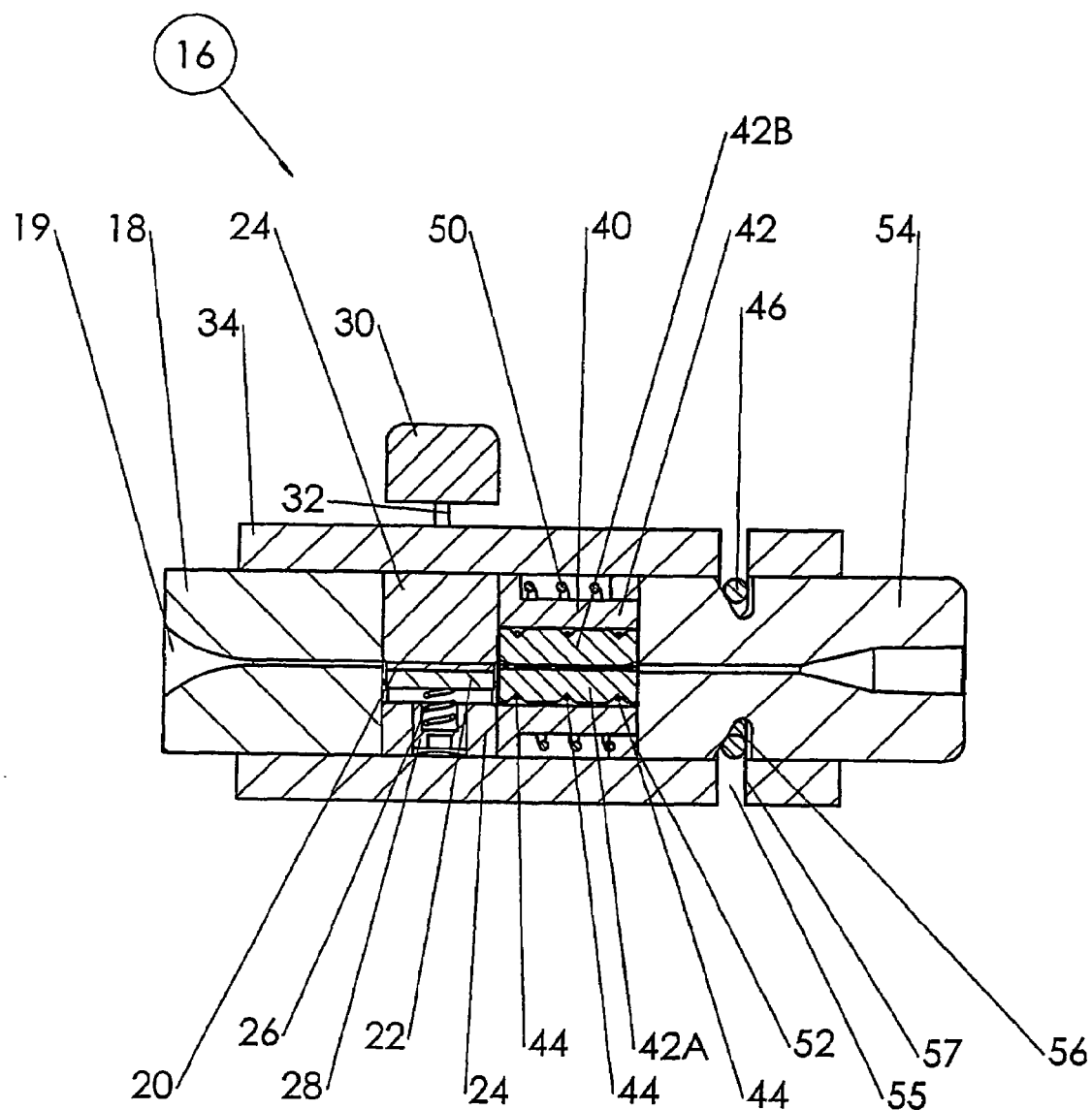
FIGS. 5-15 show sequential general and detailed views of the insertion of the two parts of the cable in the coupler and rotation of one of the parts.
Figure 6:
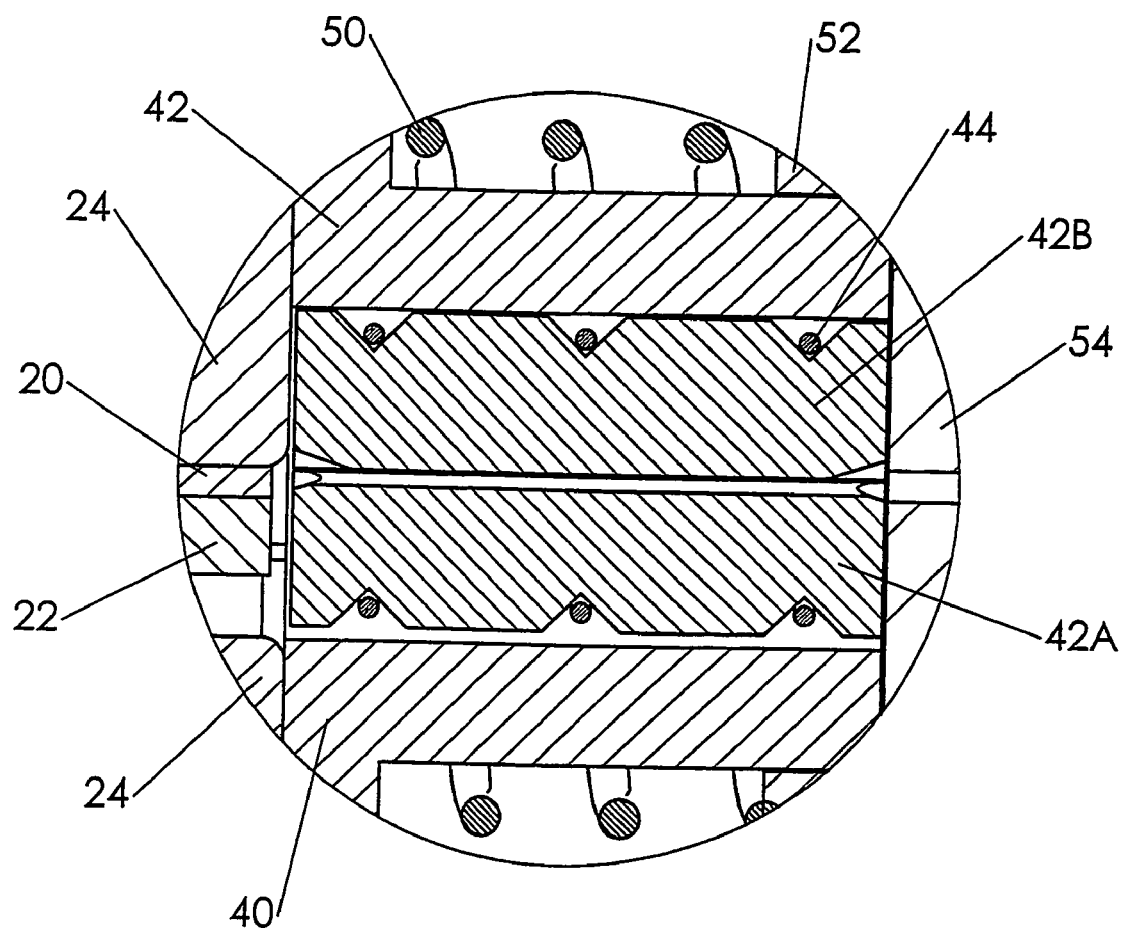
Figure 7:
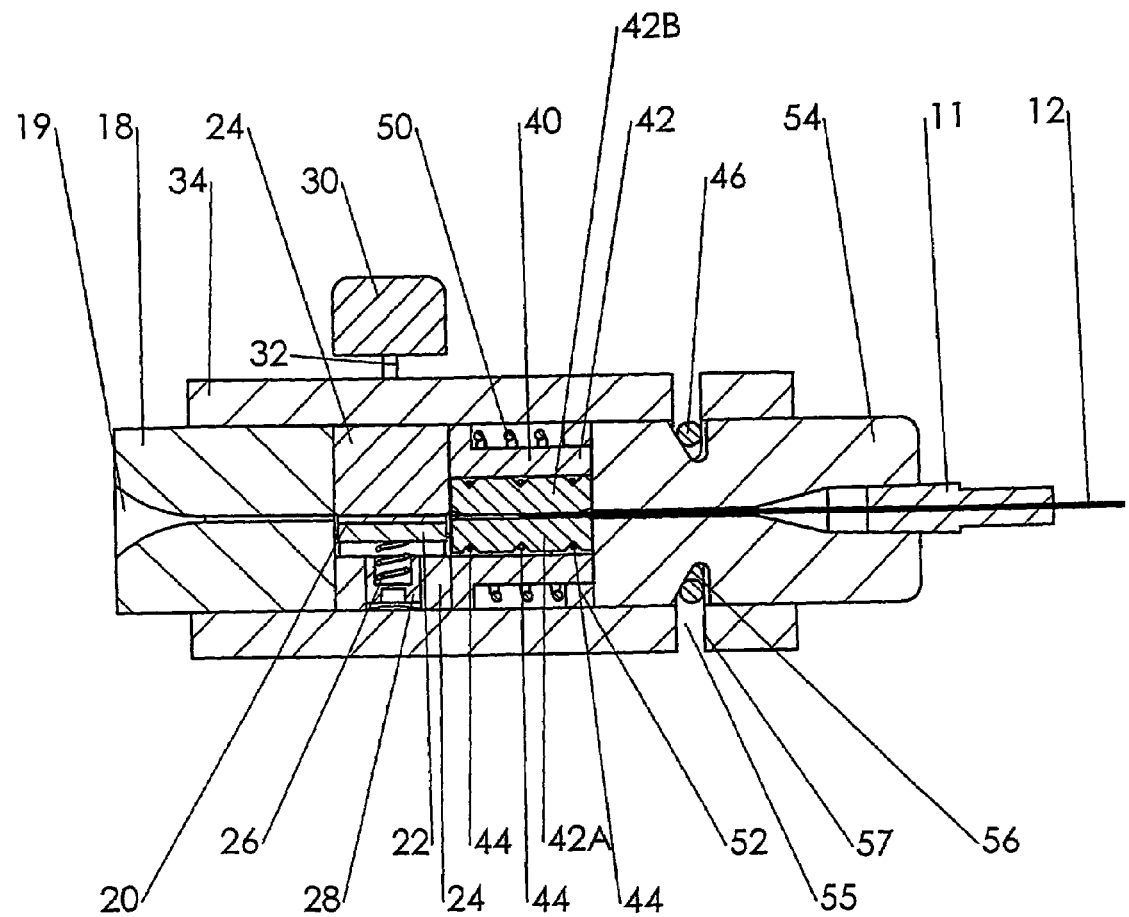
Figure 8:
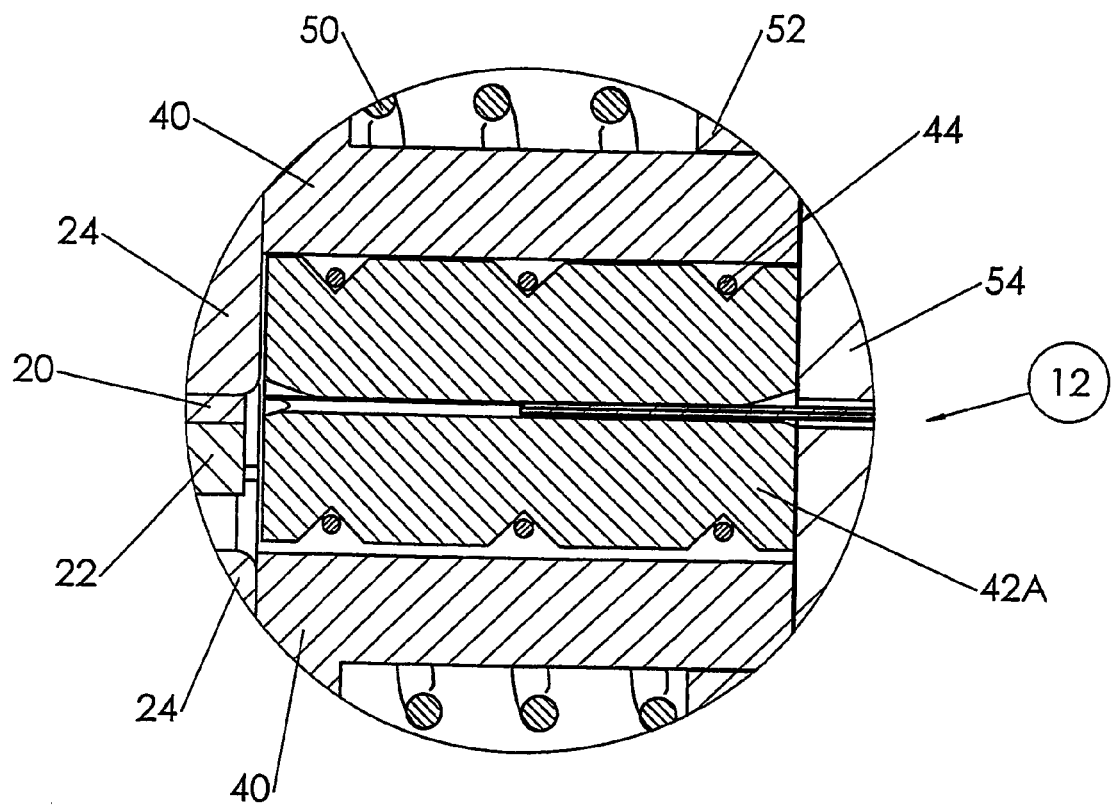
Figure 9:
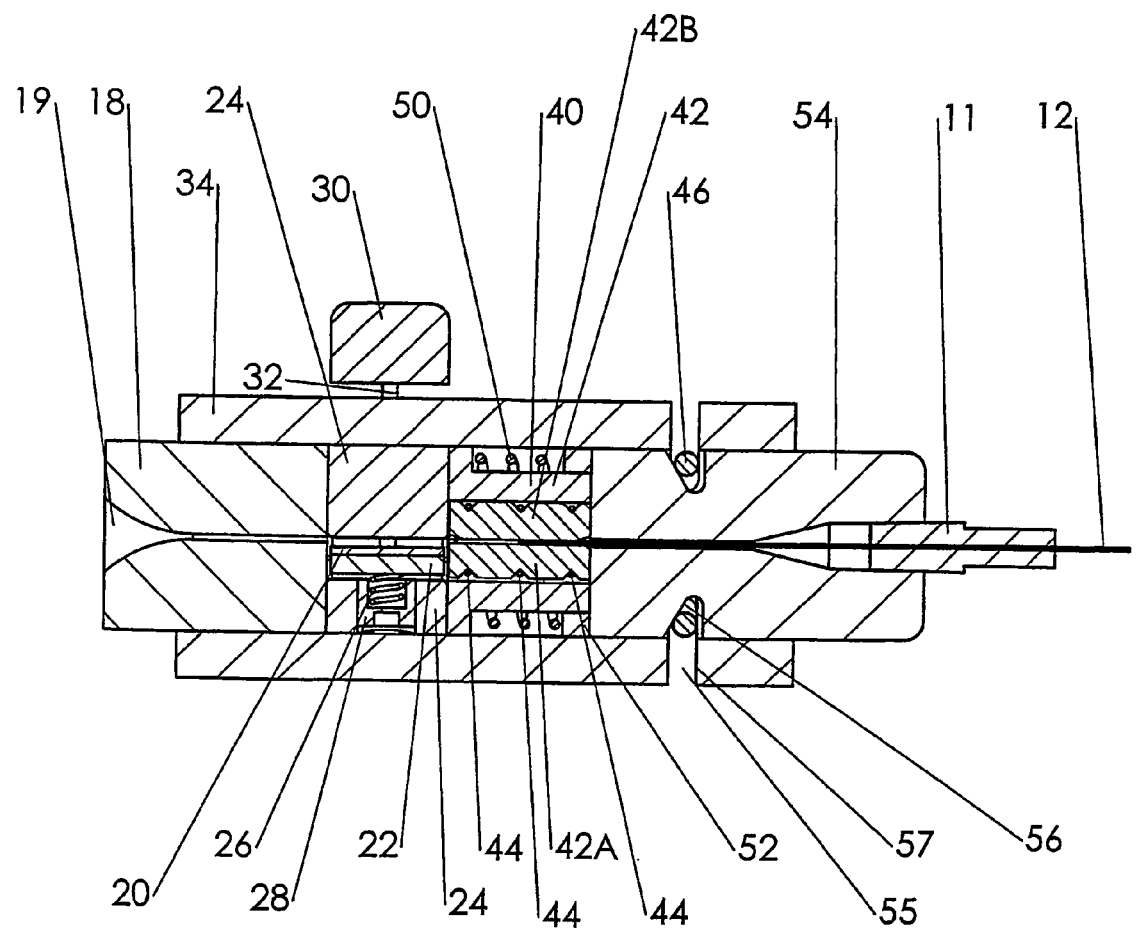
Figure 10:
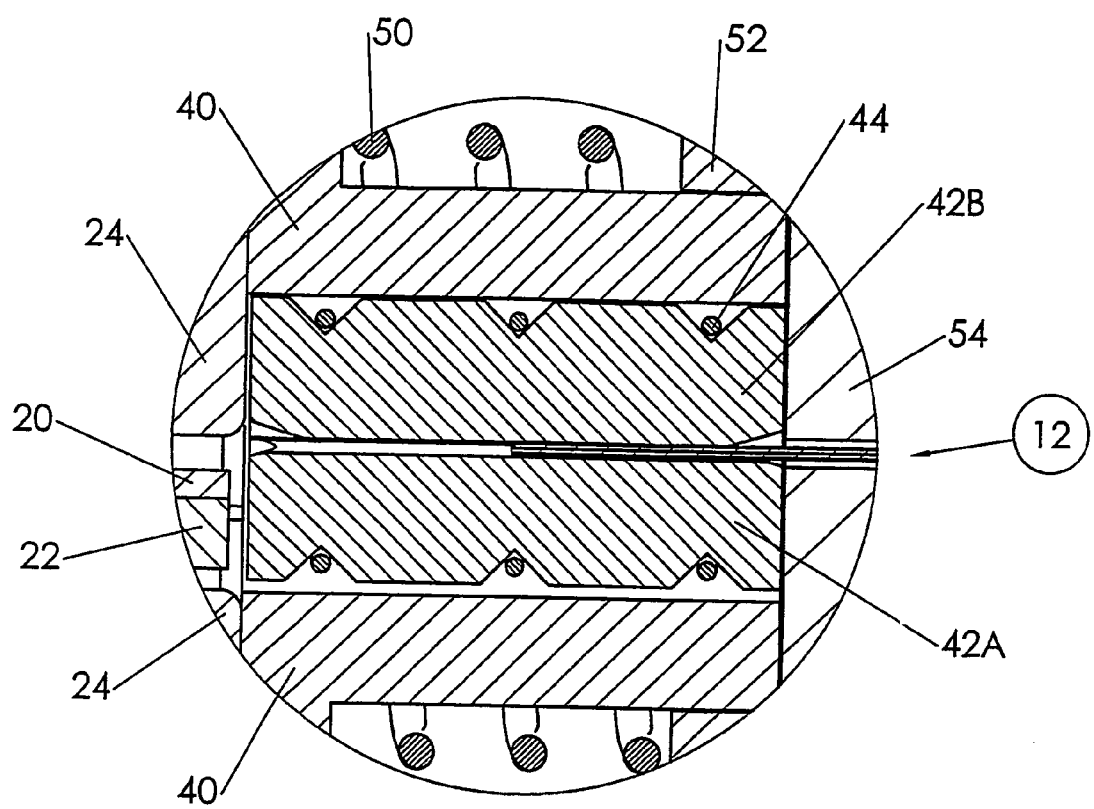
Figure 11:
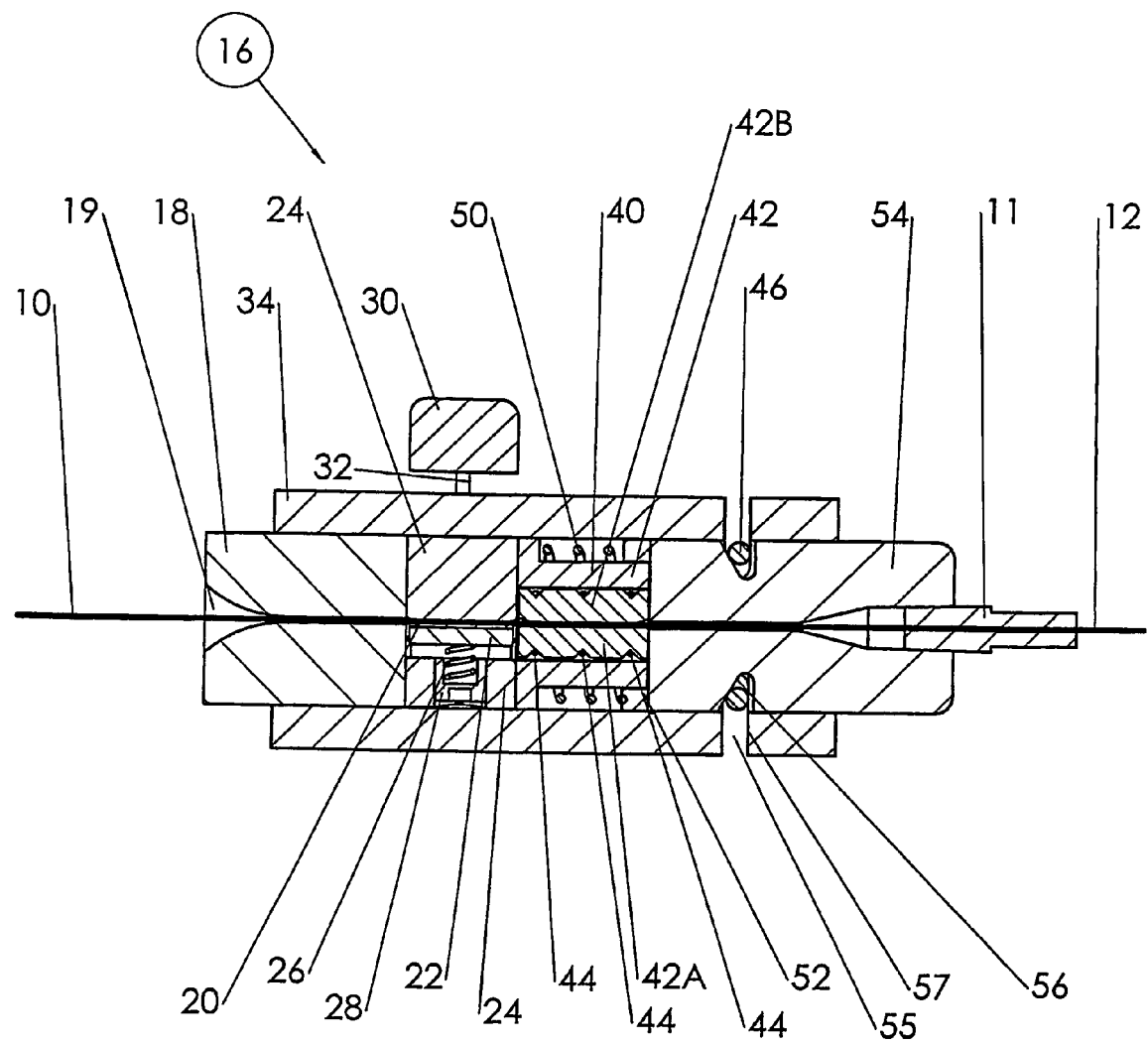
Figure 12:
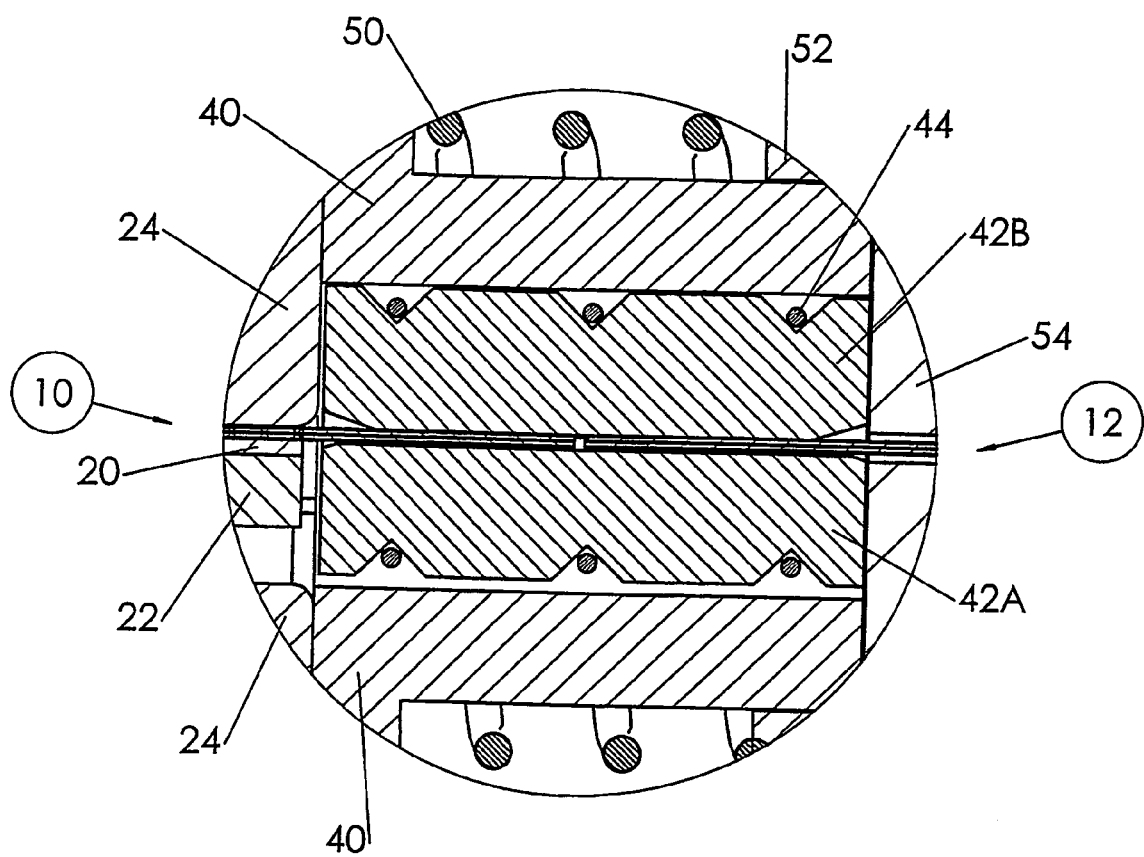
Figure 13:
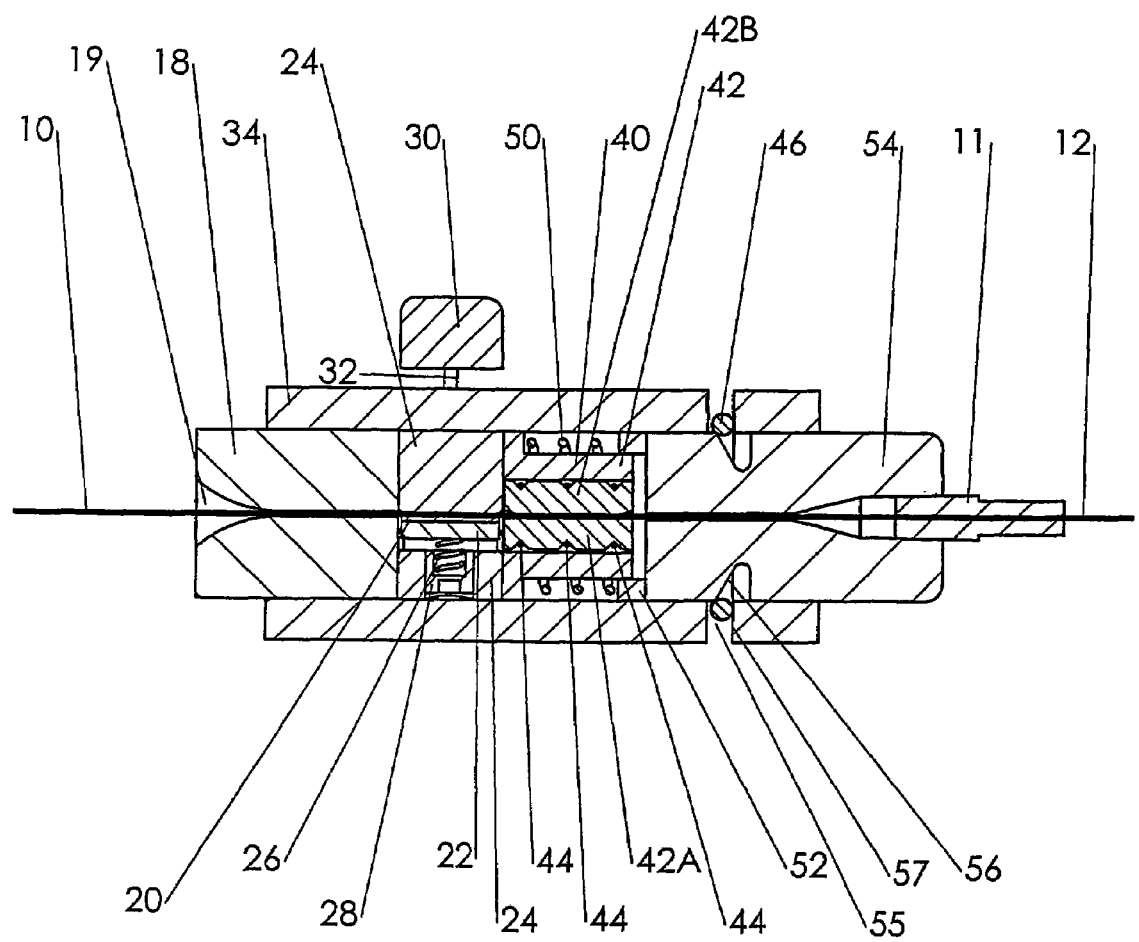
Figure 14:
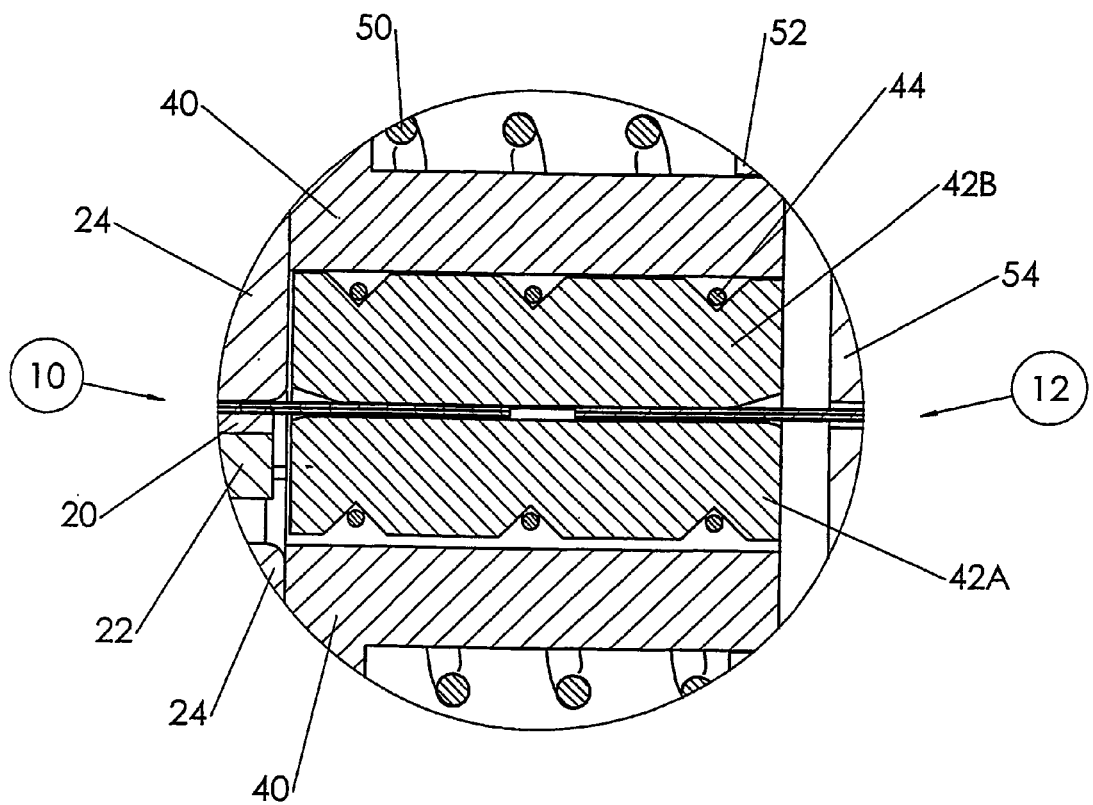
Figure 15:
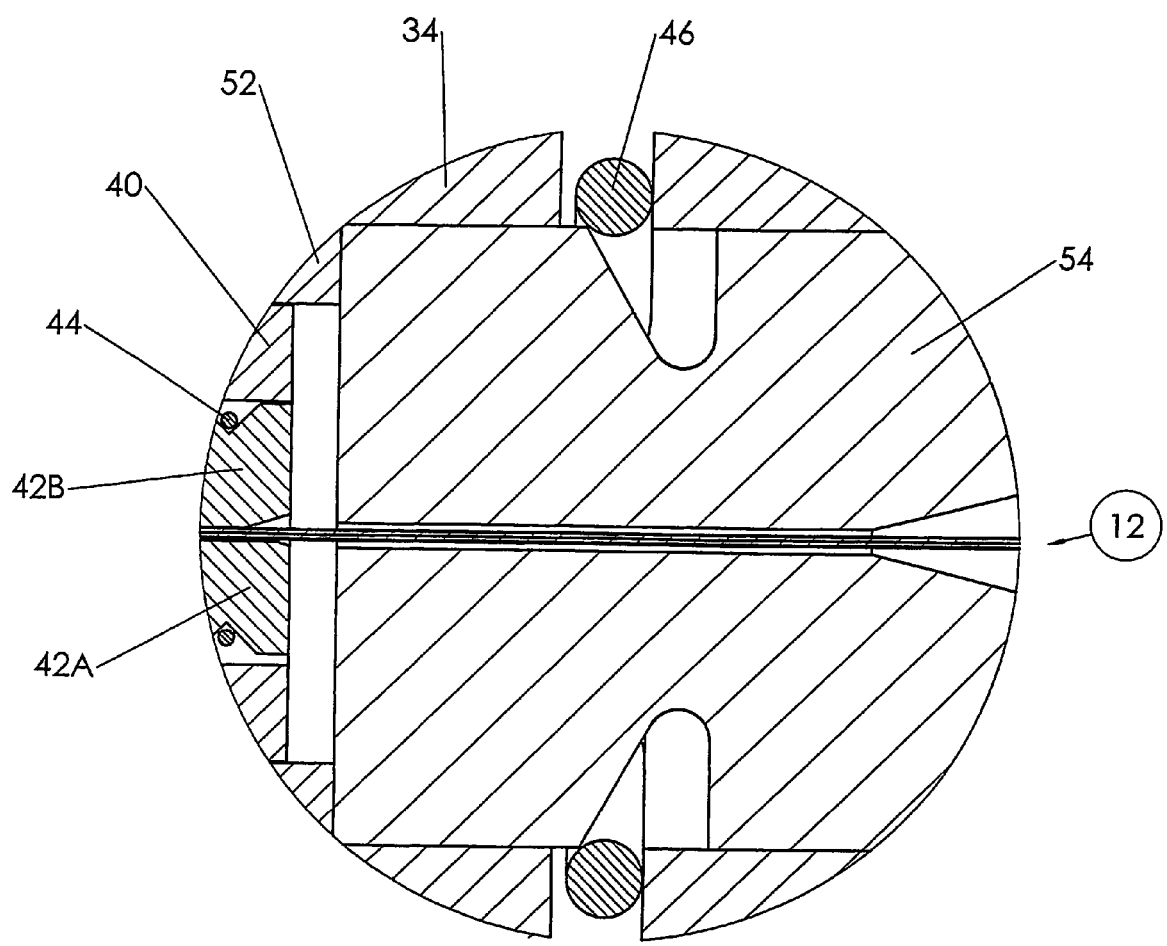

1. FIG. 5 shows the coupler before insertion of the cables. FIG. 6 is a detailed view of the alignment cylinder 43, which is empty at this point, grooved component 42A pressing against flat component 42B. First cable locking pad 20 is pressed up against cylinder 24.
2. FIG. 7 shows second cable 12 inserted through second cable guide 54 into alignment cylinder 42 and locked in place with cable luer 11. FIG. 8 shows in detail that the cable has pushed apart components 42A and 42B.
3. In FIG. 9 first spring button 30 has been pressed down pushing down spring 26. FIG. 10 shows in detail that this releases pressure from locking pad 20, thereby creating a gap between pad 20 and cylinder 24 through which cable 10 will be inserted
4. In FIG. 11 first cable 10 has been inserted through first guide 18 to alignment cylinder 42 till it met second cable 12 and then first spring button 30 was released, allowing spring 26 to push up on locking pad 20, thereby holding the cable against cylinder 24. FIG. 12 shows in detail that the two cables are now meeting in alignment cylinder 42 and that first cable is held by pad 20.
5. At this point a measurement would be made by the machine or human operator of the coupler 16 to check the optical alignment of the cable connection that has been achieved to this point. If the alignment is not yet optimal, second cable can be retracted and rotated to improve the alignment, as described in the next step.
6. In FIG. 13 clip buttons 48 have been squeezed together (not shown in the figure), raising legs of clip 46 up out of second guide channel 55, thereby releasing second guide 54 which is pushed out by force of spring 50 exerted on washer 52. Second cable 12, which is locked (via luer 11) into guide 54 is retracted with the guide. FIG. 14 shows cable 12 retracted from cable 10 in alignment cylinder 42. FIG. 15 shows legs of clip 46 raised out of second guide channel 55, thereby releasing guide 54.
7. Guide 54 is rotated, which rotates second cable 12 to improve the cable 12 alignment with cable 10.
8. Guide 54 is pushed back in bringing cable 12 back into contact with cable 10 by releasing clip buttons 48, causing legs of clip 46 to spring back down into second guide channel 55, thereby locking guide 54 back in place.
9. Steps 5 to 8 are repeated until cables are optimally aligned Advantageously, the above described invention accomplishes the objects as follows. The coupler 16 enables end-to-end coupling and decoupling of cable comprising multiple fibre optic cores, and further enables second cable 12 to be rotated within alignment cylinder 42 until the fiber cores 14 align.

Furthermore, since alignment cylinder 42 is comprised of two flexibly connected parts, grooved component 42A and flat component 42B, the device can accommodate a range of cable diameters and allows for loose tolerances in manufacture. This together with the inexpensive component materials makes the device suitable for inexpensive mass production, hence disposable.

Furthermore, the active components of the device are simple to operate and their operation can be easily automated by one skilled in the art.

Furthermore one or both of the cables can be used with the coupler without any connector attached, thereby enabling a balloon to be slipped over the cable so that the cable can serve as a guide-wire.

Furthermore, since first cable guide 18 and second cable guide 54 have different openings, there is no ambiguity about choosing the right insertion opening for each cable end.

Further still, the device of the present invention provides fast and reliable means for aligning multi-core optical fibers.

It should be clear that the description of the embodiments and attached Figures set forth in this specification serves only for a better understanding of the invention, without limiting its scope as covered by the following Claims.

It should also be clear that a person skilled in the art, after reading the present specification could make adjustments or amendments to the attached Figures and above described embodiments that would still be covered by the following Claims.

The invention claimed is:

1. A fibre optic coupler assembly for optically aligning a sectioned fibre optic cable, the cable having a first end and a second end and comprising multi-core fibre optic comprising cores, the assembly comprising
   a first holder for holding the first end;
   a second holder for holding the second end comprising an aligning unit comprising a resilient construction which includes two components resiliently held together having a conduit passing through it for receiving the second end, the alignment unit rotatable with respect to the first holder for alignment of the cores of the first and second ends, and a resilient retractor, which can be pulled to retract the first end from the second end when the ends inserted in the assembly, and which, when not pulled, holds the first and second ends against each other, wherein the first holder comprises a first guide having a bore extending therethrough adjacent to a first cable lock also with a bore extending therethrough adjacent to the distal end of the aligning unit, the bores for receiving the first cable end, and wherein the lock comprises a spring pad connected by rods to a release button.

2. The fibre optic coupler assembly of claim 1, wherein the second holder comprises a second guide having a bore extending therethrough adjacent to a proximal end of the aligning unit, the second guide bore for receiving the second end, the second guide further equipped with a second lock.

3. The fibre optic coupler assembly of claim 2, wherein the second lock is a luer connector.

4. The fibre optic coupler assembly of claim 1 wherein the retractor comprises a spring adjacent to the second holder, the force of the spring restrained by a clip.

5. A fibre optic coupler assembly for optically aligning a sectioned fibre optic cable, the cable having a first end and a second end and comprising multi-core fibre optic comprising cores, the assembly comprising a first holder for holding the first end;

a second holder for holding the second end comprising an aligning unit comprising a resilient construction which includes two components resiliently held together having a conduit passing through it for receiving the second end, the alignment unit rotatable with respect to the first holder for alignment of the cores of the first and second ends, and a resilient retractor, which can be pulled to retract the first end from the second end when the ends inserted in the assembly, and which, when not pulled, holds the first and second ends against each other, wherein the two components of the aligning unit comprise a first component having along a longitudinal axis a flat surface with a groove on the surface, the groove having a diameter less than the diameter of the fibre optic cable, a second component having a flat face along a longitudinal axis, the two components held together along their flat faces by a spring mechanism.

* * * * *